US008599840B2

United States Patent
Albert et al.

(10) Patent No.: US 8,599,840 B2
(45) Date of Patent: *Dec. 3, 2013

(54) MOBILE NETWORK DEVICE BATTERY CONSERVATION SYSTEM AND METHODS

(75) Inventors: Eric Albert, Mountain View, CA (US);
Nate Begeman, Cupertino, CA (US);
Evan Doll, San Francisco, CA (US);
Charles Dominguez, Redmond, CA (US); Scott Herz, San Jose, CA (US);
Dan Keen, Sunnyvale, CA (US); David Myszewski, San Jose, CA (US);
Mallory Paine, San Jose, CA (US); Rob Yepez, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/239,113

(22) Filed: Sep. 21, 2011

(65) Prior Publication Data

US 2012/0008538 A1    Jan. 12, 2012

Related U.S. Application Data

(63) Continuation of application No. 12/013,297, filed on Jan. 11, 2008, now Pat. No. 8,059,570.

(51) Int. Cl.
*G06F 17/00* (2006.01)
(52) U.S. Cl.
USPC ............................................ 370/371; 455/574
(58) Field of Classification Search
None
See application file for complete search history.

(56) References Cited

U.S. PATENT DOCUMENTS

| 7,003,331 | B2 | 2/2006 | Cromer et al. |
| 2003/0143986 | A1 | 7/2003 | Mufti et al. |
| 2005/0136993 | A1 | 6/2005 | Lilja et al. |
| 2006/0050670 | A1 | 3/2006 | Hillyard et al. |
| 2006/0053311 | A1 | 3/2006 | Chary |

FOREIGN PATENT DOCUMENTS

EP    1722581    11/2006

OTHER PUBLICATIONS

International Search Report and Written Opinion received in corresponding PCT application No. PCT/US2008/086802 dated Apr. 1, 2009.
Translation of an Office Action issued in related Japanese Patent Application No. 2010-542237; dated Feb. 16, 2012 (6 pages).
Patent Abstracts of Japan Publication No. 2004-164566 of Japanese Patent Application 2003-156791; Dated Oct. 6, 2004 (1 page).
Office Action dated Nov. 14, 2012 in Chinese Application No. 200880124498.5.
Chinese Patent Appln. No. 200880124498.5. Notification of 2nd Office Action & Suppl. Search Report (May 9, 2013).

*Primary Examiner* — Bunjob Jaroenchonwanit
(74) *Attorney, Agent, or Firm* — Womble Carlyle Sandridge & Rice LLP

(57) ABSTRACT

The battery life of a mobile device operating in a wireless network environment is extended by terminating network communication activities after a specified period of time. Network communication activities may be restored when any one of a specified number of user actions are detected.

18 Claims, 5 Drawing Sheets

MOBILE NETWORK DEVICE BATTERY CONSERVATION SYSTEM AND METHODS

This is a continuation of, and claims priority to, U.S. patent application Ser. No. 12/013,297 (filed Jan. 11, 2008), which is hereby incorporated by reference.

BACKGROUND

The invention relates generally to mobile wireless devices and, more particularly, to a system and methods for extending the battery life in a network capable mobile device. As used herein, the term "network" refers to those networks designed to use any one of the family of IEEE standards for wireless local area networks that extend the 802.3 (wired Ethernet) standard into the wireless domain.

The use of wireless mobile devices as a means for communicating via the Internet and local intranets is becoming ubiquitous. The popularity of such devices has increased in part because they may be used whenever and wherever one chooses, as long as there is a wireless access point with which to make the connection. Even in the absence of manifest or purposeful "use" by the user, a mobile device connected to a wireless network periodically communicates with it's local access point. This communication requires the periodic transmission of high power radio signals which, in turn, imposes a significant energy drain on the mobile device's battery. Such background activity leads to shortened battery life.

In view of the above, there is a need to provide an effective system and method(s) to address the battery drain phenomenon which, at the same time, does not significantly detract from the user's experience of using the mobile device.

SUMMARY

In accordance with the invention, the battery life of a network-capable wireless mobile device is extended by selectively terminating the device's communication link ("association") with a network and re-establishing the link as needed. In one embodiment, the device's communication link is terminated after a specified interval in which no user action results in an application that needs or uses the network communication link. Illustrative applications that can result in network access include, but are not limited to: Internet browser applications such as Internet Explorer, Safari, Firefox and Netscape; messaging applications such as Apple Inc.'s iChat, AOL Instant Messenger, Yahoo Messenger or any ICQ-like program; communication applications, such as Microsoft Outlook, Apple Inc.'s Mail, or other mail or messaging programs; virtual information monitor applications such as Apple Inc.'s Dashboard or other applications that employ GUI widgets to provide networked-sourced information to user; antivirus software such as that offered by Norton or McAfee; anti-spam software; spyware detection software or other system health software that require definitions from online sources. (Illustrative applications that typically do not result in network access include, but are not limited to, address book or contact applications, calculator applications, non-network audio playback applications, drawing applications, photo applications, word processing/text editing applications, and non-network calendar applications.) The specified interval may be a preset fixed interval, a user-specified interval, an interval based on the device's network (or application) usage patterns or a combination of these approaches.

In another embodiment, the specified interval may be extended by temporarily pausing a timer used to account for the specified interval during a background process's utilization of the device's established communication link. In this approach, a background process's use of the device's communication link may be made transparent to the mechanism used to selectively terminate the device's communication link.

DETAILED DESCRIPTION

The following description is presented to enable any person skilled in the art to make and use the invention as claimed and is provided in the context of the particular examples discussed below, variations of which will be readily apparent to those skilled in the art. Accordingly, the claims appended hereto are not intended to be limited by the disclosed embodiments, but are to be accorded their widest scope consistent with the principles and features disclosed herein.

During the development of an illustrative mobile telephone that included wireless network capability, several operational tests were made in various environments. In at least one such test, it was found that the battery life of a first phone was substantially greater than that of a substantially similar phone in a substantially similar environment (i.e., in an environment where the device had virtually continuous access to a wireless network access point).

The reason for the difference in battery life and, therefore, the usefulness of the mobile device to a user was not readily apparent. After a large number of additional tests and further evaluation, it was determined that the phone exhibiting shortened battery life maintained its association with its local access point more often and for longer periods of time than the phone exhibiting longer battery life did with its local access point. Additional analysis revealed that the power needed to maintain the device's connection with a local access point (i.e., an "association") was expensive because such an association requires the device, when not being explicitly used for network communications by a user, to periodically transmit high power radio signals (e.g., the transmission of a "beacon" or "I'm still here" signal). It was further discovered that, compared to maintaining a network association, the power needed to establish a network association was small.

In recognition of these operational characteristics, a system and method(s) in accordance with the invention disassociates a network-capable mobile device from its wireless access point after a specified period of time in the absence of action by the user that would indicate express network use was imminent. Association with the device's local access point is automatically re-established upon the need for network communication. While many embodiments of the invention rely on user actions to signal an imminent use of the network, some embodiments may interpret those signals from other software in the system and the indications may be interpreted to signal network use that is not necessarily imminent.

Figure 1A:
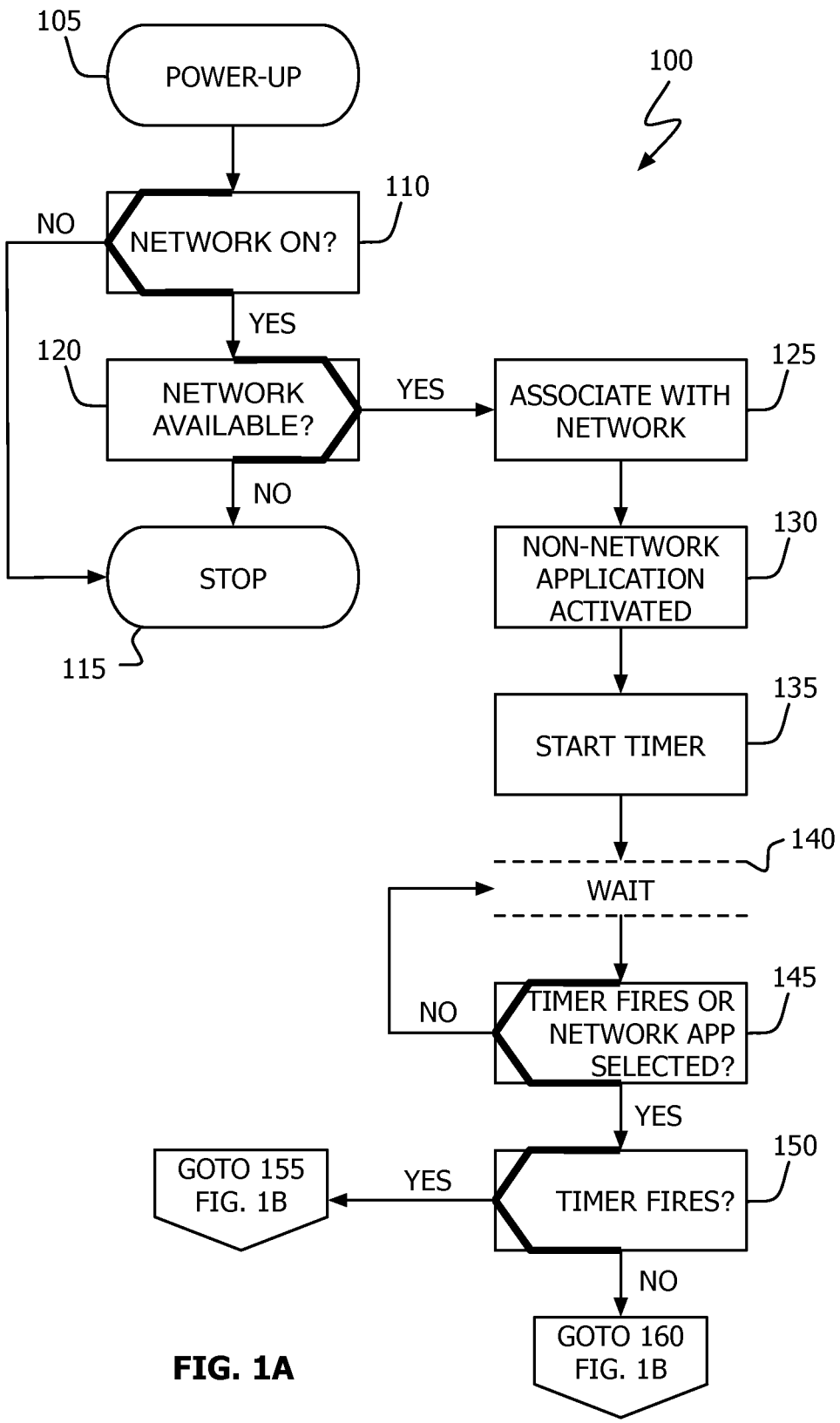
FIGS. 1A and 1B show, in flowchart form, an operational method in accordance with one embodiment of the invention.

Referring to FIG. 1, operational method 100 in accordance with one embodiment of the invention is illustrated. As shown in FIG. 1A, on device power-up (block 105), the device determines whether its wireless network capability is activated (block 110). Illustrative wireless networks include, but are not limited to, those defined by the IEEE 802.11 family of standards. If the device's wireless network capability is not activated (the "No" prong of block 110), further processing in accordance with the invention is halted (block 115). If the device's wireless network capability is activated (the "Yes" prong of block 110), a further check is made to determine if at least one wireless network is available (block 120). If no wireless network is available (the "No" prong of block 120), further processing is halted (block 115). If at least one wireless network is available (the "Yes" prong of block 120), the device associates with that network (block 125). As used herein, "associate" means to establish a communication link with a network. One of ordinary skill in the art will recognize that an "available" network in accordance with block 120 may require a password or key to access. Without such a key, access is denied and, in such a case, processing in accordance with operation 100 would halt (block 115).

After network association in accordance with block 125, when the user navigates to, selects or activates a non-network application (block 130), a disassociation timer is started (block 135). As used herein the phrase "non-network application" refers to any application that does not need access to a network to function properly. In another embodiment, in addition to (or in place of) initiating a disassociation timer on the activation of a non-network application in accordance with block 130, the timer could also be activated when the last active network application is deactivated. Collectively these approaches, and others that offer the same function, may be referred to as "application events" as they rely on or are triggered by the activation or deactivation of applications executing on a network-capable mobile device. Illustrative non-network applications include, but are not limited to, an address book or contact application, a calculator application, a non-network audio playback application, a drawing application, a photo application, a word processing/text editing application and a non-network calendar application. Once the disassociation timer is started in accordance with block 135, operational method 100 waits (block 140). As long as the disassociation timer does not fire or the user does not select or activate a network application (the "No" prong of block 145), operation 100 continues to wait (block 140). If either the disassociation timer fires or the user selects/activates a network application (the "Yes" prong of block 145), a further check is made to determine which of these actions has occurred (block 150). If the disassociation timer fired (the "Yes" prong of block 150), operation 100 continues at block 155 in FIG. 1B. If the user selected/activated a network application (the "No" prong of block 150), operation 100 continues at block 160 in FIG. 1B.

Figure 1B:
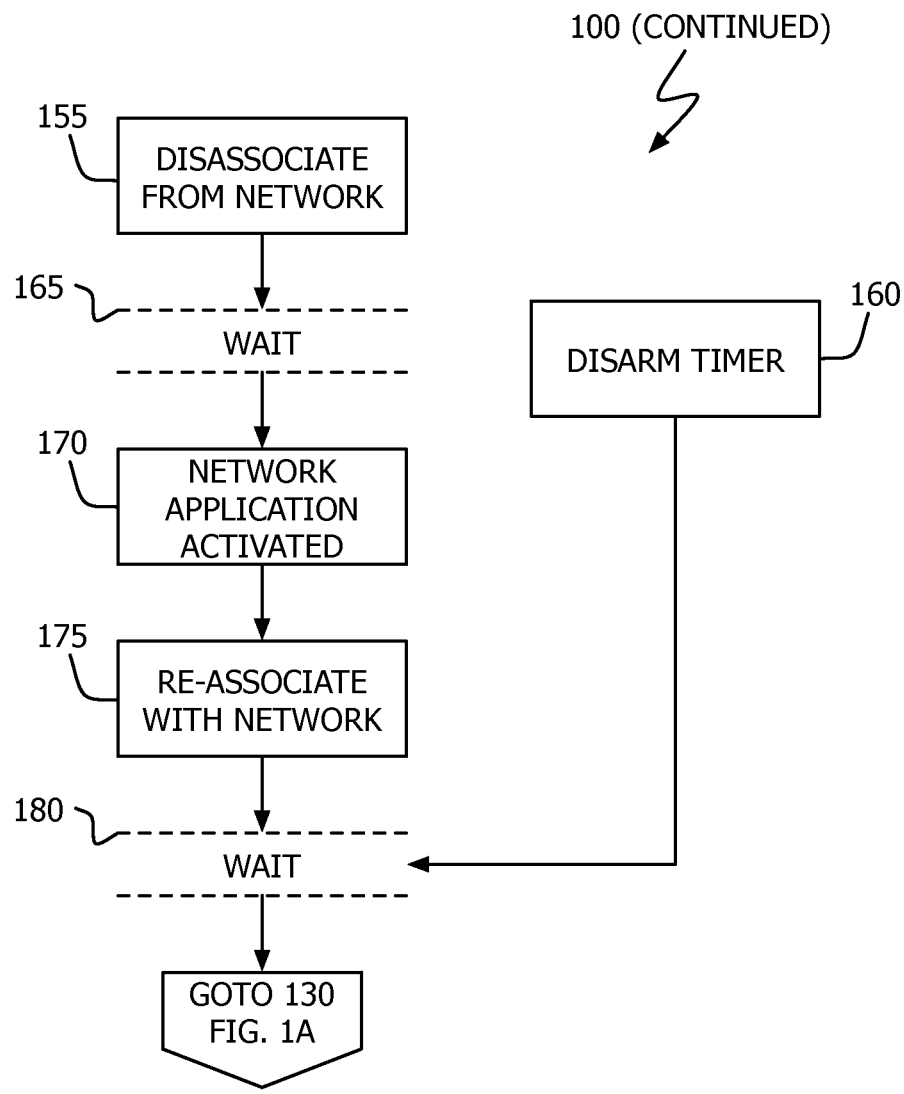

Referring to FIG. 1B, when the disassociation timer fires in accordance with the "Yes" prong of block 150, the device disassociates from the network (block 155) and waits (block 165) until the user navigates to, selects or activates a network application (block 170). As used herein, "disassociate" means to terminate a communication link with a network. Once network use is indicated in accordance with block 170, the device re-associates with the network (block 175) and waits (block 180) until the user once again selects/activates a non-network application whereafter operation 100 continues at block 130. If instead the user navigated to, selected or activated a network application in accordance with the "No" prong of block 150, the device disarms the disassociation timer (block 160) and waits (block 180) until the user once again selects/activates a non-network application whereafter operation 100 continues at block 130.

Figure 2A:
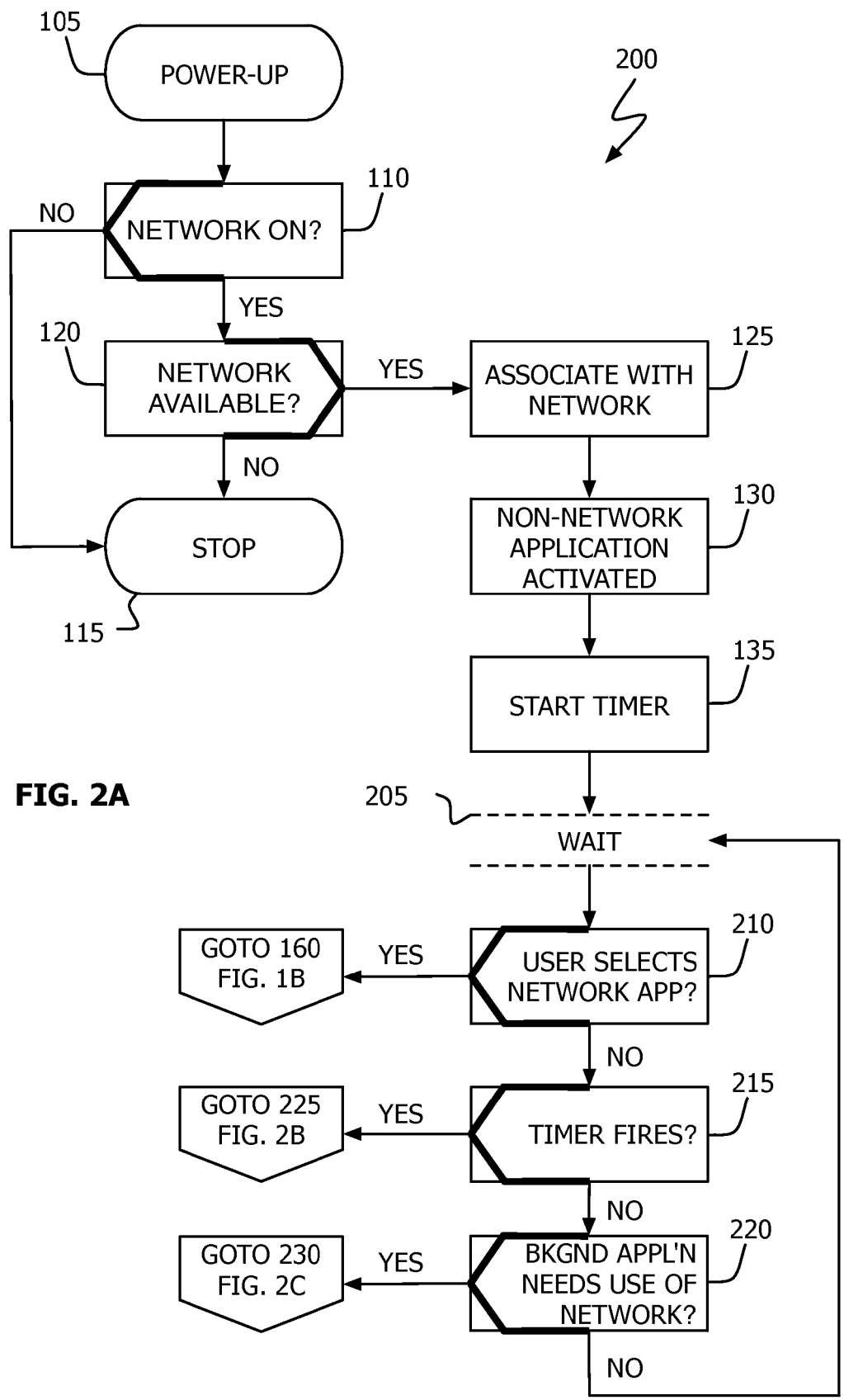
FIGS. 2A, 2B and 2C show, in flowchart form, an operational method in accordance with another embodiment of the invention.
Figure 2B:
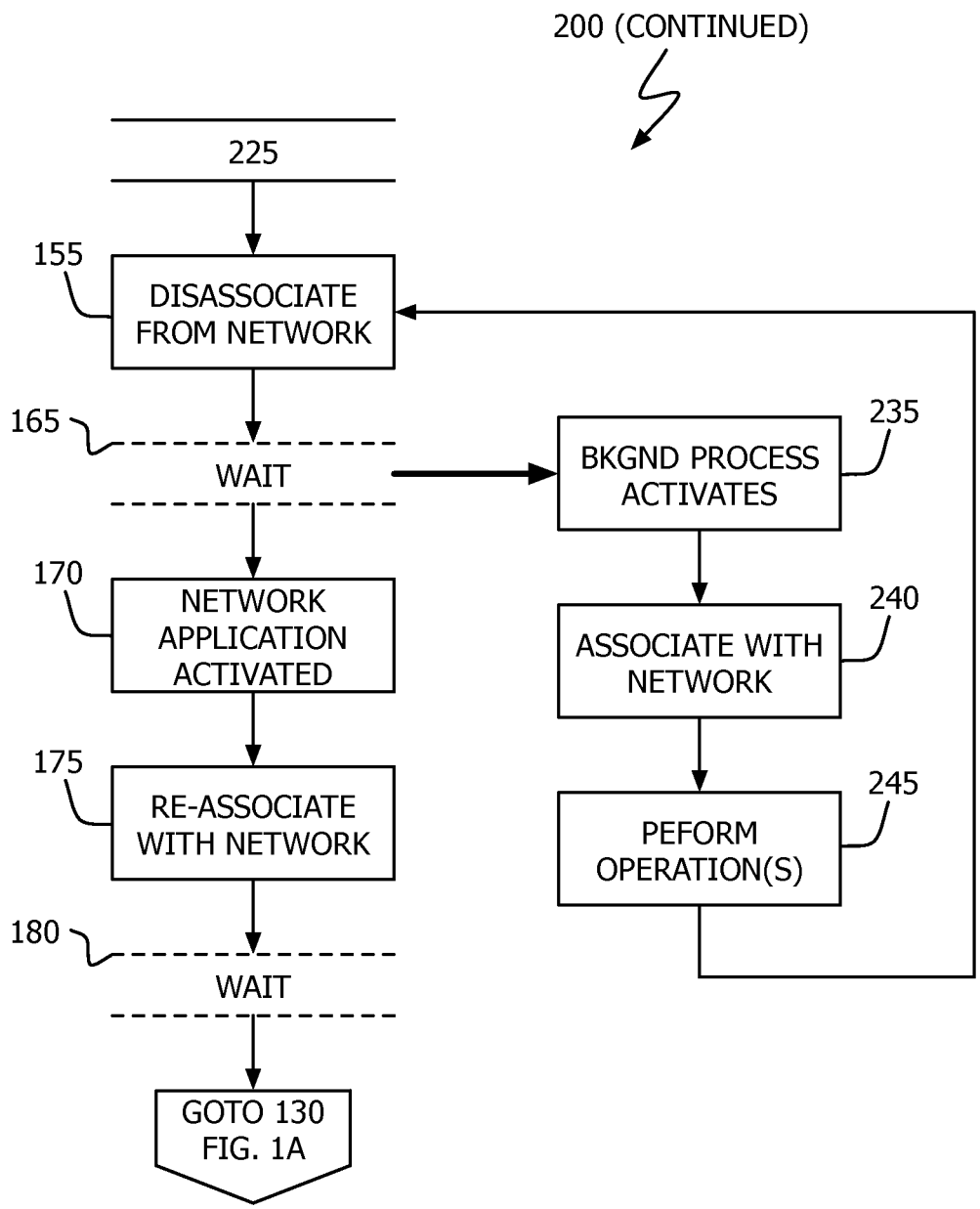
Figure 2C:
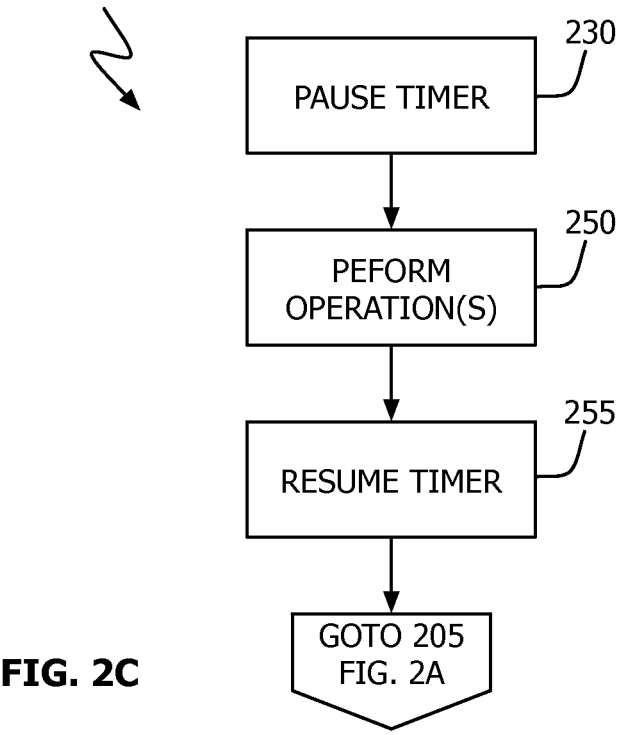

Referring to FIG. 2, operational method 200 in accordance with another embodiment of the invention is illustrated. In this embodiment, the wireless mobile device includes applications that, as part of their normal operation, require access to a network. One illustrative application of this type is a mail application that has been set to automatically query for mail every 15, 30 or 60 minutes (or any specified interval). As shown in FIG. 2A, operational method 200 is identical to operational method 100 through the acts of block 135 (see discussion above). In embodiments of this type, an additional check must be made to account for an application needing background access to a network (hereinafter referred to as a "background" process). Following timer activation in accordance with block 135, operation 200 waits (block 205) until the user navigates, selects or activates a network application (the "Yes" prong of block 210), the disassociation timer fires (the "Yes" prong of block 215) or a background process needs network access (the "Yes" prong of block 220). As shown: if the user navigates to, selects or activates a network application, operation 200 continues at block 160 of FIG. 1B; if the disassociation timer fires, operation 200 continues at block 225 of FIG. 2B; and if a background process needs network access, operation 200 continues at block 230 of FIG. 2C.

Referring to FIG. 2B, when the disassociation timer fires in accordance with the "Yes" prong of block 215, operation 200 continues at block 225 which, as shown, is substantially similar to the behavior specified in blocks 160-180 of FIG. 1B. In addition, if during the "wait" period of block 165 a background process activates and is in need of network access (block 235), the device associates with the network (block 240), the background process performs whatever network operations it needs (block 245) and, thereafter, the device disassociates from the network (block 160).

Referring to FIG. 2C, when a background process needs access to the network while the disassociation timer is active (i.e., started but not fired) in accordance with the "Yes" prong of block 220, the device pauses the disassociation timer (block 230), the background process performs whatever network operations it needs (block 250), and the device resumes the disassociation timer (block 255), whereafter operation 200 continues at block 205 of FIG. 2A.

Figure 3:
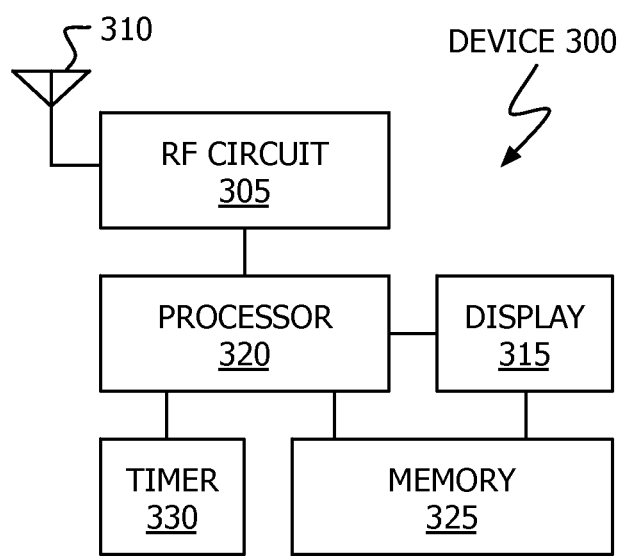
FIG. 3 shows, in block diagram form, a mobile wireless device in accordance with one embodiment of the invention.

Referring to FIG. 3, device 300 adapted to operate in accordance with the invention includes radio frequency (RF) transmit and receive circuitry 305, antenna 310 (which may or may not, be visible to a user of device 300), user display element 315, processor 320, memory 325 and disassociation timer 330. Processor 305 may be a single computer processor, a special purpose processor (e.g., a digital signal processor), a plurality of processors coupled by a communications link or a custom designed state machine embodied in a hardware device such as an integrated circuit including, but not limited to, application specific integrated circuits or field programmable gate arrays. Memory 325 may include non-volatile memory (for the retention of user preference information and device operating programs including, but not limited to, program modules for embodying power management operations in accordance with the invention) and volatile memory (for retention of run-time data including, but not limited to, display information). That is, acts in accordance with FIGS. 1 and 2 may be performed by processor 305 executing instructions organized into one or more program modules which are stored or retained in memory 325. Disassociation timer 330 may be a hardware timer separate from processor 305 and memory 325, a hardware timer incorporated within processor 305 or a software timer (i.e., storage associated with or incorporated into processor 305 or memory 325).

With respect to the embodiments described above, disassociation timer 330 has been described in terms of a fixed time interval without mention of any specific interval. It will be recognized that the specific interval chosen will be dependent upon the environment and intended use of the mobile wireless device. For example, a device intended for short periods of use with extended periods of non-use may use a disassociation timer interval that is fairly short (e.g., 5-10 minutes). In contrast, a device designed for a larger number of uses with a relatively short time between each use may employ a longer disassociation timer interval (e.g., 30-45 minutes).

In one embodiment, the chosen disassociation interval may be user selectable. For example, while an initial disassociation interval may be set as a default, the user may be able to designate a different interval through a user preference application (e.g., "short," "long," "10 minutes," "30 minutes," "1 hour," . . . ). In another embodiment, the disassociation interval may be dynamically set based on actual network usage. In some embodiments of this type, actual network usage may be tracked so that an interval may be chosen or computed that optimizes battery usage for the precise pattern of use that the device is subjected to. In other embodiments of this type, network-capable application usage may be tracked so that an appropriate disassociation interval representative of the time between activations or use of these applications may be chosen. In yet other embodiments, a combination of these approaches may be chosen.

With respect to re-associating a wireless mobile device to a network, this may be done in a number of ways. In one approach, the device may be re-associated with the network when an application executing on the device actually needs network access. In another approach, the device may be re-associated with the network when it is "likely" that network access will be needed. An example of the latter approach is to re-associate whenever the user selects or activates a network-capable application (e.g., a mail program) or enters a state from which a network-capable application could be launched (e.g., a "home screen" or "home page"). The former approach tends to minimize the amount of power consumed for network operations by limiting the time and power used to associate with a network. The drawback, of course, is slower response for the user when they select an operation that actually requires network access as the user must then wait for network association to occur before their request may be processed or issued to the network. The latter approach tends to consume more power because network acquisition or association will be sought or maintained when it is not really needed. The benefit, of course, is improved user responsiveness.

With respect to the embodiment of FIG. 2, a wireless mobile device may have a plurality of background applications or processes that need periodic network access. In devices of this type, each background process may independently cause the device to temporarily suspend the disassociation timer while it accesses the network (see block 235-245 in FIG. 2B). Alternatively, all background processes may be synchronized to a common interval so that the device is not randomly cycled to the network (i.e., briefly associated and then disassociated). In another embodiment, network association patterns may be monitored and if background processes are cycling the device more than a specified amount, the device may be held associated to the network until an operational change in the background processes occurs (i.e., one or more background processes are terminated or for a specified period of time). In still another embodiment, if more than a threshold number of background processes are active, the device may be kept associated with the network until an operational change in the background processes occurs.

Various changes in the materials, components, circuit elements, as well as in the details of the illustrated operational methods are possible without departing from the scope of the following claims. For instance, the precise progression of checks illustrated in FIGS. 2 and 3 may be altered without departing from the scope of the claims below.

The invention claimed is:

1. A battery conservation method for a wireless network-capable device, comprising:
    establishing, on a mobile device, a communication association with a wireless network;
    initiating a timer on the mobile device in response to a specified application event, wherein the specified application event comprises:
        when an application that does not need access to the wireless network to function as designed is made a foreground application on the mobile device, and
        when all active applications that need access to the wireless network to function as designed are deactivated on the mobile device;
    pausing the timer to permit a background application on the mobile device to use the communication association and, thereafter, resuming the timer; and
    deactivating the timer when an application that needs access to the wireless network to function as designed is made a foreground application on the mobile device before the timer expires, otherwise terminating the communication association with the wireless network when the timer expires.

2. The method of claim 1, further comprising:
    establishing, on the mobile device, a temporary communication association with the wireless network after terminating the communication association and in response to a background network-capable application executing on the mobile device;
    permitting the background network-capable application to use the temporary communication association; and
    terminating the temporary communication association after the background network-capable application completes use of the temporary communication association.

3. The method of claim 1, wherein the act of initiating a timer comprises initiating a timer to expire after a predetermined interval.

4. The method of claim 1, wherein the act of initiating a timer comprises initiating a timer to expire after a user selectable time interval.

5. The method of claim 1, wherein the act of initiating a timer comprises initiating a timer to expire after a time interval that is dependent upon use of the wireless network by network-capable applications on the mobile device.

6. The method of claim 1, wherein the act of deactivating the timer further comprises deactivating the timer when more than a predetermined number of background applications executing on the mobile device use the communication association.

7. A non-transitory computer readable medium, comprising:
    computer code to establish, on a mobile device, a communication association with a wireless network;
    computer code to initiate a timer on the mobile device in response to a specified application event, wherein the specified application event comprises:
        when an application that does not need access to the wireless network to function as designed is made a foreground application on the mobile device, and when all active applications that need access to the wireless network to function as designed are deactivated on the mobile device;

computer code to pause the timer to permit a background application on the mobile device to use the communication association and, thereafter, resuming the timer; and computer code to deactivate the timer when an application that needs access to the wireless network to function as designed is made a foreground application on the mobile device before the timer expires, otherwise terminate the communication association with the wireless network when the timer expires.

8. The non-transitory program storage device of claim 7, further comprising:

computer code to establish, on the mobile device, a temporary communication association with the wireless network after terminating the communication association and in response to a background network-capable application executing on the mobile device;

computer code to permit the background network-capable application to use the temporary communication association; and computer code to terminate the temporary communication association after the background network-capable application completes use of the temporary communication association.

9. The non-transitory program storage device of claim 7, wherein the computer code to initiate a timer comprises computer code to initiate a timer to expire after a predetermined interval.

10. The non-transitory program storage device of claim 7, wherein the computer code to initiate a timer comprises computer code to initiate a timer to expire after a user selectable time interval.

11. The non-transitory program storage device of claim 7, wherein the computer code to initiate a timer comprises computer code to initiate a timer to expire after a time interval that is dependent upon use of the wireless network by network-capable applications on the mobile device.

12. The non-transitory program storage device of claim 7, wherein the computer code to deactivate the timer further comprises computer code to deactivate the timer when more than a predetermined number of background applications executing on the mobile device use the communication association.

13. A wireless network-capable mobile device, comprising:

a radio-frequency circuit configured to transmit and receive radio signals to and from a mobile device and a wireless network access device;

a processor operatively coupled to the radio-frequency circuit;

a timer operatively coupled to the processor; and memory, operatively coupled to the processor, stored computer code that causes the processor to perform the method of claim 1.

14. A battery conservation method for a wireless network-capable device, comprising:

establishing, on a mobile device, a first communication association with a wireless network;

initiating, on the mobile device, a timer in response to a specified application event, wherein the specified application event comprises:

when an application that does not need access to the wireless network to function as designed is made a foreground application on the mobile device, and when all active applications that need access to the wireless network to function as designed are deactivated on the mobile device;

pausing the timer to permit a background network-capable application executing on the mobile device to use the first communication association and, thereafter, resuming the timer;

terminating the first communication association with the wireless network when the timer expires;

establishing, on the mobile device, a temporary communication association with the wireless network after terminating the first communication association and in response to a background network-capable application executing on the mobile device;

permitting the background network-capable application to use the temporary communication association; and terminating the temporary communication association after the background network-capable application completes use of the temporary communication association.

15. The method of claim 14, further comprising establishing, on the mobile device, a second communication association with the wireless network after terminating the first communication association;

initiating, on the mobile device and after establishing the second communication association with the wireless network, the timer a second time in response to when an application that does not need to access the wireless network to function as designed is made a foreground application on the mobile device; and deactivating the timer, after initiating the timer a second time, when a network-capable application is made a foreground application on the mobile device before the timer expires.

16. A wireless network-capable mobile device, comprising:

a radio-frequency circuit configured to transmit and receive radio signals to and from a mobile device and a wireless network access device;

a processor operatively coupled to the radio-frequency circuit;

a timer operatively coupled to the processor; and memory, operatively coupled to the processor, stored computer code that causes the processor to perform the method of claim 14.

17. A battery conservation method for a wireless network-capable device, comprising:

establishing, on a mobile device, a communication association with a wireless network;

initiating a timer on the mobile device in response to a specified application event, wherein the specified application event comprises:

when an application that does not need access to the wireless network to function as designed is made a foreground application on the mobile device, and when all active applications that need access to the wireless network to function as designed are deactivated on the mobile device, wherein the timer is set to expire after an interval dynamically determined based on actual network usage;

pausing the timer to permit a background application on the mobile device to use the communication association and, thereafter, resuming the timer; and deactivating the timer when an application that needs access to the wireless network to function as designed is made a foreground application on the mobile device before the timer expires, otherwise terminating the communication association with the wireless network when the timer expires.

18. The method of claim 17, further comprising:

establishing, on the mobile device, a temporary communication association with the wireless network after terminating the communication association and in response to a background network-capable application executing on the mobile device;

permitting the background network-capable application to use the temporary communication association; and terminating the temporary communication association after the background network-capable application completes use of the temporary communication association.

* * * * *